Jan. 1, 1924 — G. W. COOKE — 1,479,028

FAUCET

Filed Feb. 24, 1923

INVENTOR.
George W. Cooke
BY
Stockbridge & Borst
ATTORNEYS

Patented Jan. 1, 1924.

1,479,028

UNITED STATES PATENT OFFICE.

GEORGE W. COOKE, OF JAMAICA, NEW YORK, ASSIGNOR TO GEORGE W. COOKE CO. INC., A CORPORATION OF NEW YORK.

FAUCET.

Application filed February 24, 1923. Serial No. 620,915.

*To all whom it may concern:*

Be it known that I, GEORGE W. COOKE, a citizen of the United States, residing at Hillcrest, Jamaica, Long Island, in the borough of Queens, city of New York, county of Queens, and State of New York, have invented certain new and useful Improvements in Faucets, of which the following is a full, clear, and exact description.

My invention relates more particularly to faucets of the type commonly used in water coolers, syrup containers and the like in which a spring biases the valve to closed position and the end of the valve stem protrudes for manipulative purpose. More usually these are of the so-called push faucet type, the stem being pressed longitudinally inwardly to unseat the valve.

My invention is intended to provide a faucet of this general class which is especially suited for controlling viscous liquids, such as fruit syrups, although my improved faucet is susceptible of the general use to which faucets of this type are ordinarily put. The rapid deposition of the fruit sugars of the syrup within the faucet and the lodgement of the fruit pulp on the valve seat causes frequent cleansing of the faucet to be necessary. As heretofore constructed provision has not been made to remove the faucet readily from the shank in the container, and no means have been provided affording access to the interior of the faucet. Hence the only available way for the users to cleanse the faucets has been to place hot water in the container and open the faucets, relying upon the passage of the water through the faucets to remove the sugar deposited therein. This mode of cleaning the faucets, however, is unsatisfactory for several manifest reasons.

An object of my invention is to obviate this difficulty and to provide a faucet and shank construction which enables the faucet to be removed from the shank while leaving the shank in the container, and affords ready access to the interior of the faucet for cleaning purpose. Other general objects are simplicity of construction, economy in manufacture, and facility in assembly and manipulation. Still other objects and advantages of my invention will appear from the following description.

As heretofore constructed the inner end of the faucet has been attached in some suitable way, as by screw threads, to one end of a straight tubular shank which is inserted into the opening provided for it in the container and a lock nut on the inside of the container is screwed up on the threaded shank, drawing the end of the faucet and an interposed gasket tightly against the outer wall of the container. It is therefore not possible to remove the faucet without also removing the shank. Furthermore the faucet and shank have been secured together so firmly that they could not be separated without the use of special tools. In fact they have not been intended to be separated after once they have been assembled. My invention contemplates the provisions of means on the shank exteriorly of the container, to hold the shank against rotation while the faucet is being unscrewed or otherwise removed therefrom, thereby making possible the removal of the faucet independently of the shank and avoiding the necessity of unscrewing the lock nuts from the shank on the inside of the container when it is desired to clean the faucet.

My invention also contemplates a removable head for the faucet body which preferably carries with it the valve mechanism. In accordance with my invention the valve stem is guided in an axial opening in the end of the head and protrudes therethrough for the purpose of manipulation. A spring biases the stem to its innermost or valve closing position, while stop means on the valve stem for limiting its movement under the influence of the spring are readily removable to permit the parts to be easily disassembled. In the preferred form of my invention, therefore, the faucet is of the pull type as distinguished from the push type, whereby the valve will come off with the head when the faucet is taken apart to be cleaned.

My invention contemplates other features of construction as will hereinafter more fully appear. I shall now describe the illustrated embodiment of my invention and shall thereafter point out my invention in claims.

Figure 1:
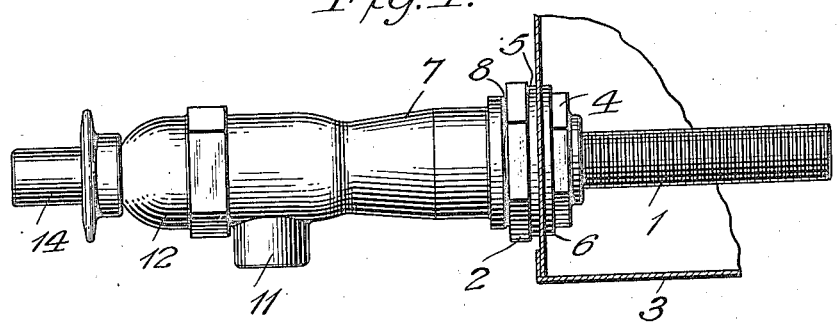
Fig. 1 is a side elevation of a complete faucet embodying my invention, shown applied to a container, a portion of which is illustrated in section.
Figure 2:
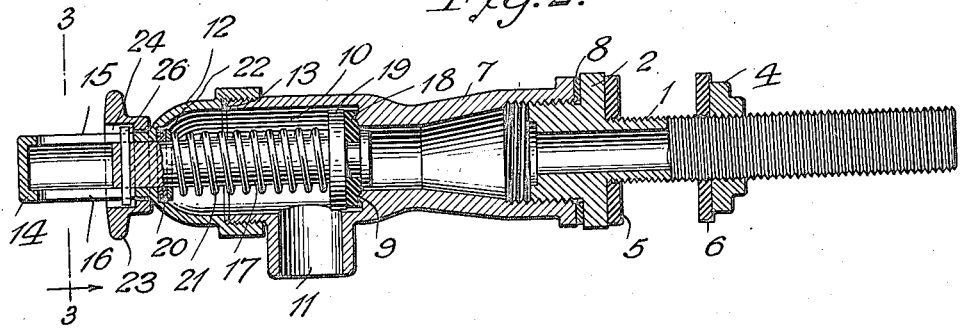
Fig. 2 is a longitudinal sectional elevation of the faucet and shank.
Figure 4:
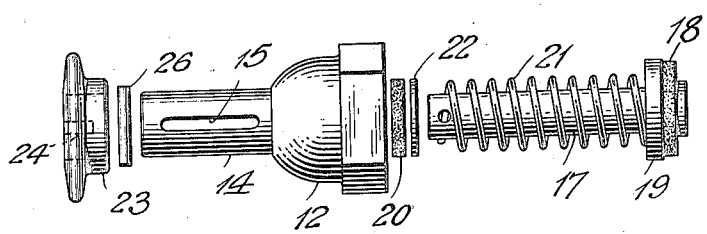
Fig. 4 is a plan of the faucet head and valve parts carried thereby, the parts being shown in disassembled relation.
Figure 3:
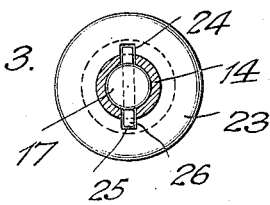
Fig. 3 is a transverse section on the line 3—3 of Fig. 2.

The shank 1, which is a straight, tubular, externally threaded stem has near its outer end an integral, non-circular flange or collar portion 2. This shank is secured in the container 3 by inserting the inner end of the shank within a hole provided for it near the bottom of the container, and screwing up a nut 4, washers or gaskets 5 and 6 being interposed externally and internally of the container wall between the collar 2 and the nut 4. The protruding shank portion is screw threaded and the body portion 7 of the faucet is internally screw threaded at its inner end where it is screwed upon the protruding shank portion, a gasket 8 being interposed between the flanged end of the body portion 7 and the outer face of the collar 2.

The body member 7 of the faucet is a straight tubular member constricted somewhat in diameter in its middle zone, and immediately in advance of this constricted zone its internal diameter is enlarged to provide an overhanging, circumferential shoulder 9, constituting the valve seat, and an enlarged discharge chamber 10 from the shoulder 9 to the outer end of the body member 7. An outlet nipple or spout 11 opens into the discharge chamber 10 immediately in front of the shoulder 9.

The outer end of the body member 7 is closed by a removable head 12. In the form shown this head is dome shaped and screws upon the outer end of the body member, a suitable gasket 13 being interposed between the end of the body member and an annular shoulder which is formed in the head as an abutment for the end of the body member.

The head 12 is provided in its end with an axial opening in line with which is a tubular axial extension 14, two opposite longitudinal slots 15 and 16 being provided within the walls of this tubular extension. The valve stem 17 slides in this tubular extension and has at its inner end a suitable annular disc valve 18 which is applied by stretching over the inner end of the valve and snaps into place on a reduced neck portion immediately in front of a collar 19 formed on the valve stem. A packing ring 20 is placed on the valve stem at the inner end of the discharge chamber and is pressed by a coiled thrust spring 21 against a seat provided for the packing ring within the head 12 around the axial opening, a metallic washer 22 being preferably interposed between the spring and the packing ring. The coiled thrust sping 21 surrounds the valve stem within the discharge chamber and bears with its outer end against the washer 22 and with its inner end against the collar 19, and thus tends to hold the valve closed.

To manipulate the valve a pull ring or annulus 23 is slidably disposed on the tubular extension 14 and has its inner periphery slotted or notched at two opposing points, thereby providing the two opposing undercut notches or slots 24 and 25 extending from the outer face part way through to the inner face. To secure the valve stem to the ring 23 for the purpose of manipulation, a transverse pin 26 is employed which is inserted through a hole provided therefor in the end of the valve stem and is of such a length that it protrudes through the slots 15 and 16 into the slots 24 and 25 in the ring 23. In this way the pin is held from escaping.

To open the faucet the operator will place his thumb on the outer end of the tubular projection 14 and with two fingers withdraw the ring 23, thereby retracting the valve stem and the valve. The packing ring 20 will prevent any of the liquid from escaping outside of the discharge chamber 10 around the valve stem. When it is desired to clean the faucet, it can be unscrewed from the shank, a wrench being applied to the collar 2 to hold the shank from turning. The faucet may then be opened by taking off the head 12, thereby exposing the interior of the faucet. If desired, the valve stem and parts carried thereby may be disassembled from the head by pressing the valve stem back until the pin 26 can be taken out, thereby releasing all of the parts.

It is obvious that various modifications may be made in the construction shown in the drawings and above particularly described within the principle and scope of my invention.

I claim:

1. In combination, a tubular shank adapted to be secured in an opening in a container and having non-circular integral collar external of the container, and a faucet comprising an integral tubular body member having its inner end removably screwed on to the outer end of the shank and having the internal diameter of its outer end enlarged to form an overhanging annular shoulder constituting a valve seat, a removable head secured on the outer end of the body member, and a valve and valve stem slidably carried in an axial opening in the head biased to closed position and removable as a unit with the head.

2. In combination, a tubular shank adapted to be secured in an opening in a container and having a non-circular integral collar external of the container, and a faucet comprising an integral tubular body member having its inner end removably screwed on to the outer end of the shank and having the internal diameter of its outer end enlarged to form an overhanging annular shoulder constituting a valve seat, a removable head secured on the outer end of the body member, a valve and valve stem slidably carried in an axial opening in the head biased to closed position and removable as a unit with the head, and manipulative means for the valve stem coupled to the stem externally of the head.

3. A faucet comprising a tubular body member having its internal diameter enlarged toward its outer end to form a discharge chamber with an overhanging annular shoulder at its inner end constituting a valve seat, a removable head for the body member having a reduced tubular axial extension provided with a longitudinal slot, a valve and a stem therefor guided in the said tubular extension on the head, a spiral thrust spring surrounding the stem within the discharge chamber and biasing the valve to closed position, and a manipulative member for the valve connected to the valve stem through the said longitudinal slot.

4. A faucet comprising a tubular body member having its internal diameter enlarged toward its outer end to form a discharge chamber with an overhanging annular shoulder at its inner end constituting a valve seat, a removable head for the body member having a reduced tubular axial extension provided with two opposing longitudinal slots, a valve and a stem therefor guided in the said tubular extension on the head, a spiral thrust spring surrounding the stem within the discharge chamber and biasing the valve to closed position, a manipulative annulus slidably disposed on the tubular extension, and a transverse pin passing through the end of the valve stem and protruding through the slots in the tubular extension behind the manipulative annulus.

5. A faucet comprising a tubular body member having its internal diameter enlarged toward its outer end to form a discharge chamber with an overhanging annular shoulder at its inner end constituting a valve seat, a removable head for the body member having a reduced tubular axial extension provided with two opposing longitudinal slots, a valve and a stem therefor guided in the said tubular extension on the head, a spiral thrust spring surrounding the stem within the discharge chamber and biasing the valve to closed position, a manipulative annulus slidably disposed on the tubular extension and having two opposing longitudinal slots in its inner periphery extending from its outer face partially through the annulus, and a transverse pin removably disposed in the end of the valve stem and protruding through the slots in the tubular extension into the slots in the annulus.

6. A faucet comprising a tubular body member having its internal diameter enlarged toward its outer end to form a discharge chamber with an overhanging annular shoulder at its inner end constituting a valve seat, a removable dome shaped head screwed on the body member having a reduced tubular axial extension provided with two opposite longitudinal slots and having a seat for a packing ring formed in its top around the opening into the extension, a valve and stem therefor guided in said extension, a packing ring on the stem disposed against the seat therefor in the head, a spiral thrust spring surrounding the stem within the discharge chamber and bearing with its outer end against the packing ring and with its inner end against the valve and biasing the valve to closed position, a manipulative annulus slidably disposed on the tubular extension and having two opposing longitudinal slots in its inner periphery extending from its outer face partially through the annulus, and a transverse pin removably disposed in the end of the valve stem and protruding through the slots in the tubular extension into the slots in the annulus.

7. In combination, a threaded tubular shank adapted to be secured in an opening in a container, and having a tool-engaging part external of the container, a faucet comprising a tubular body member screwed on the outer end of the shank beyond the tool-engaging part and having its internal diameter enlarged toward its outer end to form a discharge chamber with an overhanging annular shoulder at its inner end constituting a valve seat, a removable dome shaped head screwed on the body member having a reduced tubular axial extension provided with two opposite longitudinal slots and having a seat for a packing ring formed in its top around the opening into the extension, a valve and stem therefor guided in said extension, a packing ring on the stem disposed against the seat therefor in the head, a spiral thrust spring surrounding the stem within the discharge chamber and bearing with its outer end against the packing ring and with its inner end against the valve and biasing the valve to closed position, a manipulative annulus slidably disposed on the tubular extension and having two opposing longitudinal slots in its inner periphery extending from its outer face partially through the annulus, and a transverse pin removably disposed in the end of the valve stem and protruding through the slots in the tubular extension into the slots in the annulus.

In witness whereof, I hereunto subscribe my signature.

GEORGE W. COOKE.